Patented Oct. 2, 1934

1,975,160

UNITED STATES PATENT OFFICE

1,975,160

AZO DYES AND METHOD FOR THEIR PREPARATION

Henry Jordan and Miles Augustinus Dahlen, Wilmington, Del., assignors to E. I. du Pont de Nemours & Company, Wilmington, Del., a corporation of Delaware No Drawing. Application April 4, 1933, Serial No. 664,333

14 Claims. (Cl. 260—96)

This invention relates to new azo dyes and more particularly refers to new monoazo dyes having excellent affinity for cellulose esters.

The preferred form of dyes comprised within the present invention may be represented by the following general formula:

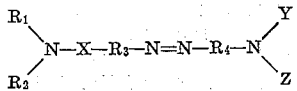

in which $R_1$ and $R_2$ are hydrogen or alkyl groups, X is CO or $SO_2$, $R_3$ and $R_4$ are benzene radicals, and Y and Z are alkyl groups.

It is an object of the present invention to produce new azo dyes having excellent affinity for cellulose esters. A further object is to produce dyes which have a satisfactory fastness to light and washing. A still further object is to produce dyes which may readily be discharged to a pure white with customary reducing discharge media. Additional objects will become apparent from a consideration of the following description.

These objects are attained according to the herein described invention in the preferred embodiment of which diazotized amines having the following general formula:

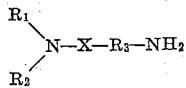

are coupled with a dialkylamine of the benzene series which has a free para position to the dialkylamino group. The letters in the aforementioned formula have the same definition as heretofore.

The invention may be more completely understood by a consideration of the following illustrative examples, in which the quantities are stated in parts by weight:

Example 1

164 parts of para-amino-dimethyl-benzamide were dissolved in 2000 parts of water and 280 parts of a 31% hydrochloric acid solution and diazotized at 10–15° C. with 69 parts of sodium nitrite. To the diazo solution there was added a solution of 122 parts of dimethylaniline in 1500 parts of water and 135 parts of a 31% hydrochloric acid solution. The mineral acidity was neutralized with sodium acetate and the coupling was allowed to stir at 15–20° C. for about 12 hours when it was found to be completed. It was then acidified again with hydrochloric acid to a Congo red paper reaction, precipitated completely with salt, and filtered. In its dry ground form the new dye represented a violet powder which was soluble in acidified water with a reddish coloration (as acids there may be used hydrochloric, sulfuric, oxalic, etc.). It dyed acetate cellulose from an acid bath in bright greenish-yellow shades. The dyeings showed an excellent fastness to washing and to light and gave a clear white discharge with the proper alkaline reducing discharge medium. The new dye most probably has the following formula:

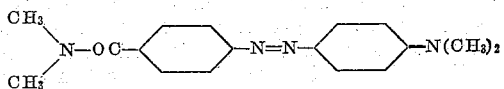

since on reduction with stannous chloride it yielded p-amino-dimethyl-benzamide and p-amino-dimethylaniline.

Example 2

By replacing in Example 1 the 122 parts of dimethylaniline by 163 parts of diethyl-m-toluidine, leaving all other conditions the same, a new dye was obtained which in its dry ground form represented a violet powder soluble in acidified water with a scarlet coloration. It dyed acetate cellulose from an acid bath in bright yellowish-orange shades which showed an excellent fastness to light and to washing and discharged to a pure white with a proper alkaline discharge medium. The new dye most probably has the following formula:

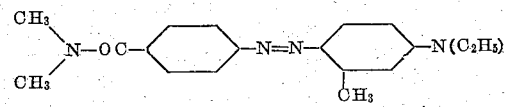

since on reduction with stannous chloride it yielded p-amino-dimethyl-benzamide and 2-amino-5-diethyl-amino-toluene.

Example 3

By replacing in Example 1 the 164 parts of p-amino-dimethyl-benzamide with 172 parts of aniline-p-sulfonamide, leaving all other conditions the same, a new dye was obtained which its dry ground form represented a dark violet powder, soluble in acidified water with a scarlet coloration. It dyed acetate cellulose from an acid bath in bright yellowish-orange shades which showed the same properties as the dyes of Examples 1 and 2. The new dye most probably has the following formula:

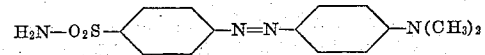

since on reduction with stannous chloride it yielded aniline-p-sulfonamide and p-amino-dimethylaniline.

In place of the components used in the above examples numerous other components falling within the scope of the present invention may be substituted. For example, in place of the para-amino-dimethyl-benzamide there may be substituted para- and meta-amino-benzamide, and their monomethyl-, monoethyl- and monobutyl-derivatives, as well as the corresponding dialkyl derivatives. It is advisable to substitute the benzamido or sulfonamide group in the meta or para position to the amino group.

In place of the aniline-p-sulfonamide there may be substituted the mono- and dialkyl-derivatives thereof. In addition, other sulfonamides and alkyl-sulfonamides of the benzene series may be utilized. Among these may be mentioned: Aniline-m-sulfonamide, aniline-m-sulfon-dimethylamide, aniline-m-sulfon-monomethylamide, p-toluidine-o-sulfonamide, p-toluidine-o-sulfon-dimethylamide, p-toluidine-o-sulfon-monomethylamide, o-toluidine-p-sulfonamide, o-toluidine-p-sulfon-dimethylamide, o-toluidine-p-sulfon-monomethylamide, o-anisidine-p-sulfonamide, o-anisidine-p-sulfon-dimethylamide, and o-anisidine-p-sulfon-monomethylamide.

It is to be understood that the benzene nucleus of the diazo salt and of the coupling component may have one or more groups substituted thereon, such as the alkyl, alkoxy, halogen and hydroxy groups. These components should not have substituted thereon groups which will render the resulting dye water-soluble, for instance the carboxylic or sulfonic acid groups. It is, of course, understood that these groups must not be substituted in such a manner as to prevent coupling from taking place. Throughout the present specification and claims where reference is made to a benzamide, a sulfonamide or a dialkylamine it is to be understood that the benzene nuceli of these components may have one or more of the well known substituent groups substituted thereon, but should not have solubilizing groups, such as the carboxylic or sulfonic acid groups attached thereto.

Where a dialkylamino group is substituted on either the active or passive component of the dyes described herein, it may here be mentioned that these groups need not be the same. For instance, a methyl and an ethyl group may be attached to the same nitrogen atom, instead of similar alkyl groups being attached thereto. Likewise, the coupling component may be a monoalkylamine instead of a dialkylamine. However, more satisfactory results are usually obtained when the coupling component is a dialkylamine, so this is considered to be the preferred embodiment, although the invention is not limited thereto.

The products described herein impart colors of very satisfactory fastness to light and washing. These products have excellent affinity for cellulose esters, and are not sensitive to acid. They impart attractive and desirable shades to the treated material, these shades usually ranging from a bright greenish-yellow to reddish-orange.

They can be discharged to a pure white without any difficulty.

As many apparently widely different embodiments of this invention may be made without departing from the spirit and scope thereof, it is to be understood that we do not limit ourselves to the specific embodiments thereof except as defined in the appended claims.

We claim:

1. A process for making azo dyes insoluble in alkaline solution which comprises diazotizing and coupling an amine of the following general formula:

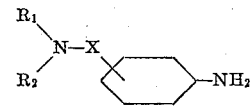

with an amine of the following general formula:

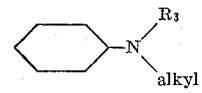

in which formulas $R_1$, $R_2$ and $R_3$ represent hydrogen or an alkyl group, and X represents CO or $SO_2$.

2. The process of claim 1 wherein the benzene nuclei may have substituted thereon members selected from the group consisting of alkyl, alkoxy, halogen and hydroxy, the position para to the amino group of the coupling component being unsubstituted.

3. The process of claim 1 wherein the group represented by X is substituted in the meta or para position to the amino group.

4. A process for making azo dyes, insoluble in alkaline solution, which comprises diazotizing and coupling an amine of the following general formula:

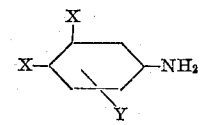

with an amine of the following general formula:

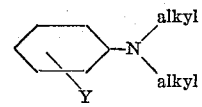

in which formulas X represents hydrogen in one case and in the other case represents

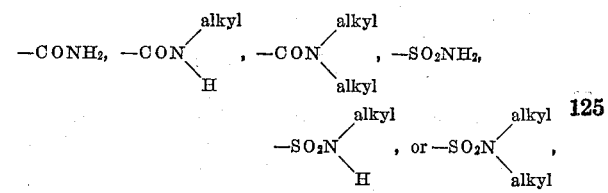

and Y represents hydrogen, alkyl or alkoxy groups.

5. A process for making azo dyes, insoluble in alkaline solution, which comprises diazotizing and coupling a member selected from the group consisting of amino-benzamides, amino-monoalkyl-benzamides, amino-dialkyl-benzamides, amino-sulfonamides, amino-mono-alkyl-sulfonamides and amino-dialkyl-sulfonamides with a dialkyl-amino-benzene having a free para position to the amino group, both of the aforementioned components being free from carboxylic and sulfonic acid groups.

6. A process for making an azo dye insoluble in alkaline solution which comprises coupling diazotized p-amino-dimethyl-benzamide with dimethyl-aniline.

7. A process for making an azo dye insoluble in alkaline solution which comprises coupling diazotized p-amino-dimethyl-benzamide with diethyl-m-toluidine.

8. Azo dyes insoluble in alkaline solution having the following general formula:

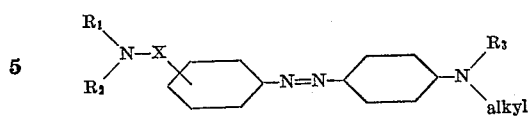

in which $R_1$, $R_2$ and $R_3$ represent hydrogen or alkyl groups, and X represents CO or $SO_2$.

9. The dyes of claim 8 wherein the benzene nuclei may have substituted thereon members selected from the group consisting of alkyl, alkoxy, halogen and hydroxy.

10. The dyes of claim 8 wherein the group represented by X is substituted in the meta or para position to the azo group.

11. Azo dyes insoluble in alkaline solution having the following general formula:

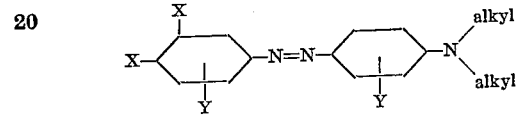

in which X represents hydrogen in one case and in the other case represents

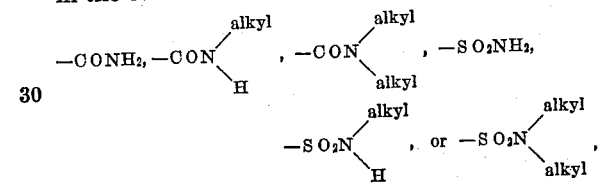

and Y represents hydrogen, alkyl or alkoxy groups.

12. Azo dyes insoluble in alkaline solution having the following general formula:

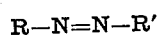

in which R represents the residue of an amino-benzamide, amino-mono-alkyl-benzamide, amino-dialkyl-benzamide, amino-sulfonamide, amino-mono-alkyl-sulfonamide, or amino-dialkyl-sulfonamide, and R' represents the residue of a dialkyl-amino-benzene having a free para position to the amino group, both of the aforementioned components being free from carboxylic and sulfonic acid groups.

13. An azo dye insoluble in alkaline solution having the following formula:

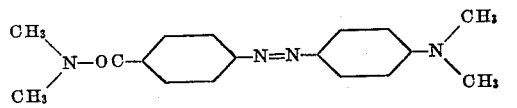

14. An azo dye insoluble in alkaline solution having the following formula:

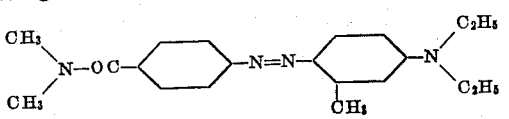

MILES AUGUSTINUS DAHLEN.
HENRY JORDAN.